United States Patent
Gero et al.

(10) Patent No.: US 10,771,262 B2
(45) Date of Patent: *Sep. 8, 2020

(54) PROVIDING FORWARD SECRECY IN A TERMINATING SSL/TLS CONNECTION PROXY USING EPHEMERAL DIFFIE-HELLMAN KEY EXCHANGE

(71) Applicant: Akamai Technologies, Inc., Cambridge, MA (US)

(72) Inventors: Charles E. Gero, Quincy, MA (US); Jeremy N. Shapiro, Brookline, MA (US); Dana J. Burd, Wakefield, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,411

(22) Filed: Apr. 23, 2019

(65) Prior Publication Data

US 2019/0253261 A1    Aug. 15, 2019

Related U.S. Application Data

(63) Continuation of application No. 15/390,587, filed on Dec. 26, 2016, now Pat. No. 10,270,601, which is a continuation of application No. 14/532,341, filed on Nov. 4, 2014, now Pat. No. 9,531,685, which is a continuation-in-part of application No. 13/714,656, filed on Dec. 14, 2012, now Pat. No. 9,647,835.

(60) Provisional application No. 61/576,378, filed on Dec. 16, 2011.

(51) Int. Cl.
| | |
|---|---|
| *H04L 9/32* | (2006.01) |
| *H04L 29/06* | (2006.01) |
| *H04L 9/08* | (2006.01) |
| *H04L 9/14* | (2006.01) |
| *H04L 9/30* | (2006.01) |

(52) U.S. Cl.
CPC .......... *H04L 9/3263* (2013.01); *H04L 9/0844* (2013.01); *H04L 9/14* (2013.01); *H04L 9/302* (2013.01); *H04L 9/3013* (2013.01); *H04L 9/3249* (2013.01); *H04L 63/0442* (2013.01); *H04L 63/061* (2013.01); *H04L 63/166* (2013.01); *H04L 2209/76* (2013.01)

(58) Field of Classification Search
CPC ....... H04L 9/3263; H04L 9/0844; H04L 9/14; H04L 9/3013; H04L 9/302; H04L 9/3249; H04L 63/0442; H04L 63/061; H04L 63/166

See application file for complete search history.

*Primary Examiner* — Oleg Korsak
(74) *Attorney, Agent, or Firm* — David H. Judson

(57) ABSTRACT

An infrastructure delivery platform provides a proxy service as an enhancement to the TLS/SSL protocol to off-load to an external server the generation of a digital signature, the digital signature being generated using a private key that would otherwise have to be maintained on a terminating server. Using this service, instead of digitally signing (using the private key) "locally," the terminating server proxies given public portions of ephemeral key exchange material to the external server and receives, in response, a signature validating the terminating server is authorized to continue with the key exchange. In this manner, a private key used to generate the digital signature (or, more generally, to facilitate the key exchange) does not need to be stored in association with the terminating server. Rather, that private key is stored only at the external server, and there is no requirement for the pre-master secret to travel (on the wire).

10 Claims, 5 Drawing Sheets

PROVIDING FORWARD SECRECY IN A TERMINATING SSL/TLS CONNECTION PROXY USING EPHEMERAL DIFFIE-HELLMAN KEY EXCHANGE

BACKGROUND

Technical Field

This application relates generally to secure network-based communications using cryptographic protocols.

Brief Description of the Related Art

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

For a traditional RSA-based TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the TLS server's publicly available RSA key. This generates an encrypted pre-master secret (ePMS), which is then provided to the TLS server. The TLS server has a private decryption key, which is then used to decrypt the encrypted pre-master secret. At this point, both the client and the server have the original pre-master secret and can use it to generate the symmetric key used for actual encrypted and secure data exchange. Decrypting the encrypted pre-master secret is the only time in the TLS connection that the private key is needed. This decryption occurs at a so-called TLS termination point. Where a CDN is used to facilitate delivery of secure content, the TLS termination point will be located in the CDN.

Some CDN customers are not comfortable sharing their private TLS (RSA, DSA, etc.) keys with the CDN service provider. Further, some customers may require an additional caveat that certain data and requests never be decrypted by the CDN at any point in any transaction, and that the data transmitted by the CDN on behalf of the customer is provably and verifiably authentic.

To address this requirement, it is known to augment an overlay network with an RSA proxy "service" that off-loads the decryption of the encrypted pre-master secret (ePMS) to an external server managed by the service provider. Using this service, instead of decrypting the ePMS "locally," the SSL server proxies (forwards) the ePMS to an RSA proxy server component and receives, in response, the decrypted pre-master secret. In this manner, the decryption key does not need to be stored in association with the SSL server. This approach is described in U.S. Publication No. 2013/0156189, the disclosure of which is hereby incorporated by reference.

In one embodiment described in that publication, at least one machine in a first network-accessible location includes an RSA proxy server software program, and at least one machine in a second network-accessible location includes an RSA proxy client software program. The RSA proxy server software program and the RSA proxy client software program each include code to establish and maintain a secure (e.g., a mutually-authenticated SSL) connection there-between. The RSA proxy client software typically executes in association with an SSL server component (such as OpenSSL). According to this disclosure, however, SSL decryption keys are not accessible to the RSA proxy client software. Rather, decryption of encrypted pre-master secrets is off-loaded to the RSA proxy server software program. In operation, the RSA proxy client software program receives and forwards to the RSA proxy server software program over the mutually-authenticated SSL connection an encrypted pre-master secret associated with a new SSL handshake request received (at the RSA proxy client) from an end user client program (e.g., an SSL-enabled web browser, a native mobile app, or the like). The RSA proxy server software program decrypts the encrypted pre-master secret using a decryption key that is maintained at the RSA proxy server software program and not otherwise accessible to the RSA proxy client software program. The RSA proxy server software program then returns a decrypted pre-master secret to the RSA proxy client software program over the mutually-authenticated SSL connection. The end user client program and the SSL server component both are then in possession of the pre-master secret (and can use it to generate the symmetric key used for encrypting the connection between them).

BRIEF SUMMARY

An infrastructure delivery platform provides a proxy service as an enhancement to the TLS/SSL protocol to off-load to an external server the generation of a digital signature, the digital signature being generated using a private key that would otherwise have to be maintained on a terminating server. Using this service, instead of digitally signing (using the private key) "locally," the terminating server proxies given public portions of ephemeral key exchange material to the external server and receives, in response, a signature validating that the terminating server is authorized to continue with the key exchange. In this manner, a private key used to generate the digital signature (or, more generally, to facilitate the key exchange) does not need to be stored in association with the terminating server. Rather, that private key is stored only at the external server, and there is no requirement for the pre-master secret to travel (on the wire).

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
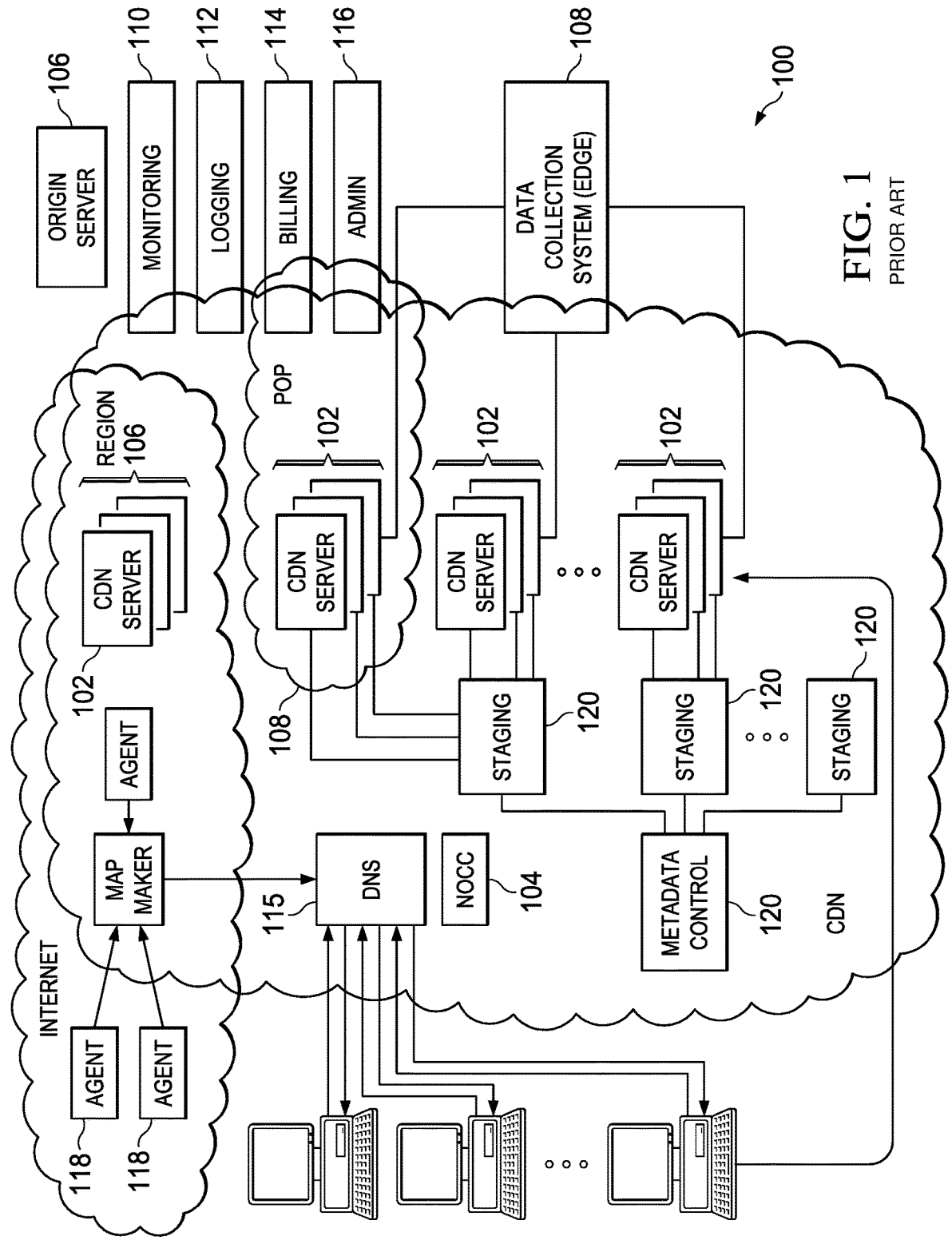
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
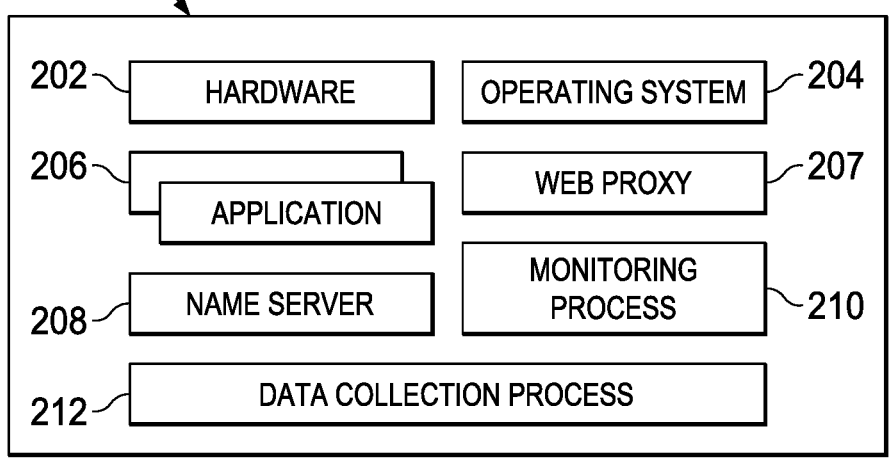
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Figure 3:
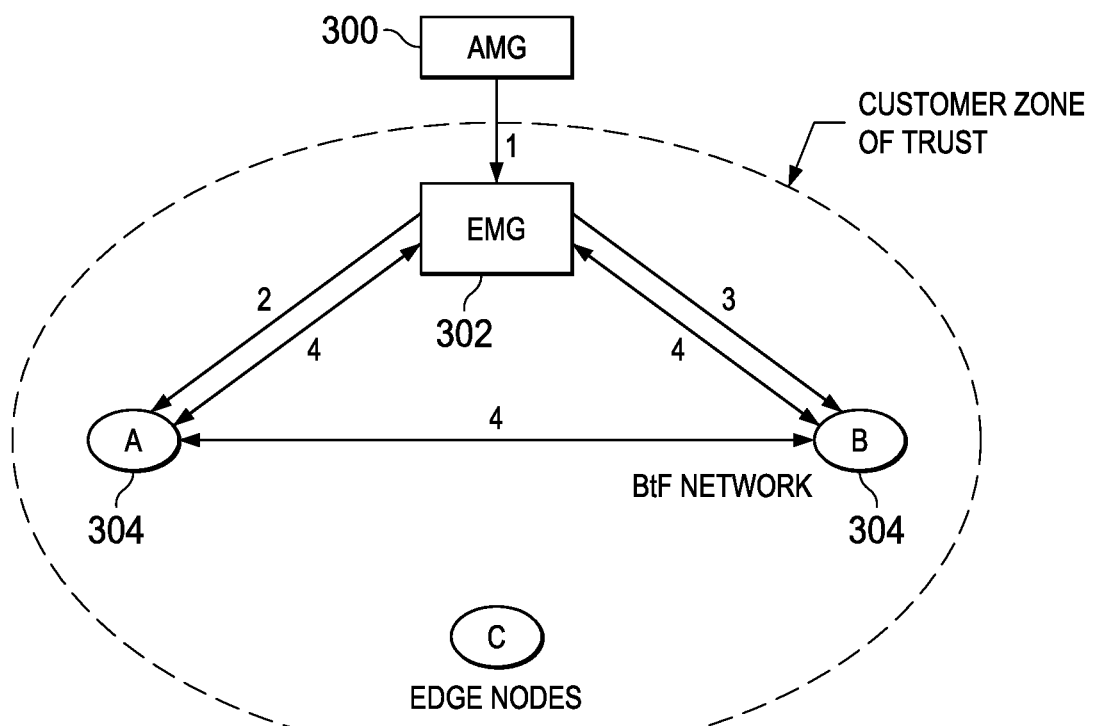
FIG. 3 illustrates a representation behind-the-firewall network configuration in which the subject disclosure may be practiced in one embodiment.

By way of further background, CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud. To accomplish these two use cases, CDN software may execute on virtual machines hosted in one or more customer data centers, and on virtual machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the service provider's other infrastructure (e.g., network and operations facilities. This type of managed solution provides an enterprise with the opportunity to take advantage of CDN technologies with respect to their Company's intranet. FIG. 3 illustrates a basic architecture of this type. In a representative implementation, a BTF network is managed by a management gateway (AMG) 300 and one or more enterprise management gateways (EMGs) 302. The AMG is located at a CDN operation and network service location. It manages a database of existing customers and has access to the EMGs. EMGs 302 exist inside the customer's firewall and manage the individual end nodes 304 of the BTF network. The end nodes correspond to the edge nodes in a traditional CDN. An AMG authorizes an EMG (step 1), and the EMG authorizes edge nodes A and B (steps 2 and 3). Both edge nodes now trust each other and the EMG to create a customer zone of trust as depicted (steps 4). According to this basic trust model, the AMG 300 grants authority to an EMG 302 to perform BTF functions for a company. The EMG 302 may then grant authority to each of the end nodes to perform various roles or tasks. Once trust is established via this chain of authorization, private data and secrets can be exchanged securely around the network. In this approach, the edge nodes typically are installed at remote branch offices (near the end users) and the EMG (parent nodes/regions) are installed at corporate hubs (typically, where application servers are located). As noted above, the solution extends acceleration for the enterprise to applications served anywhere on the Internet, such as SaaS (Software-As-A-Service) applications. By bridging an enterprise's CDN-based private overlay network with the existing CDN public internet overlay network, an end user at a remote branch office obtains an accelerated application end-to-end.

For BTF to properly accelerate SSL traffic, it needs the SSL keys and certificates on the end nodes. As described above, SSL uses a one-time RSA decryption to establish a private pre-master secret between the client and server. According to this disclosure, this RSA decryption is offloaded to a secure end node or other service which contains the private key, while the rest of the handshake and SSL connection continue as normal. This process is now described.

Terminating SSL Connections without Locally-Accessible Private Keys

With the above as background, the subject matter of U.S. Publication No. 2013/0156189 is now described. Familiarity with SSL handshaking is presumed.

Figure 4:
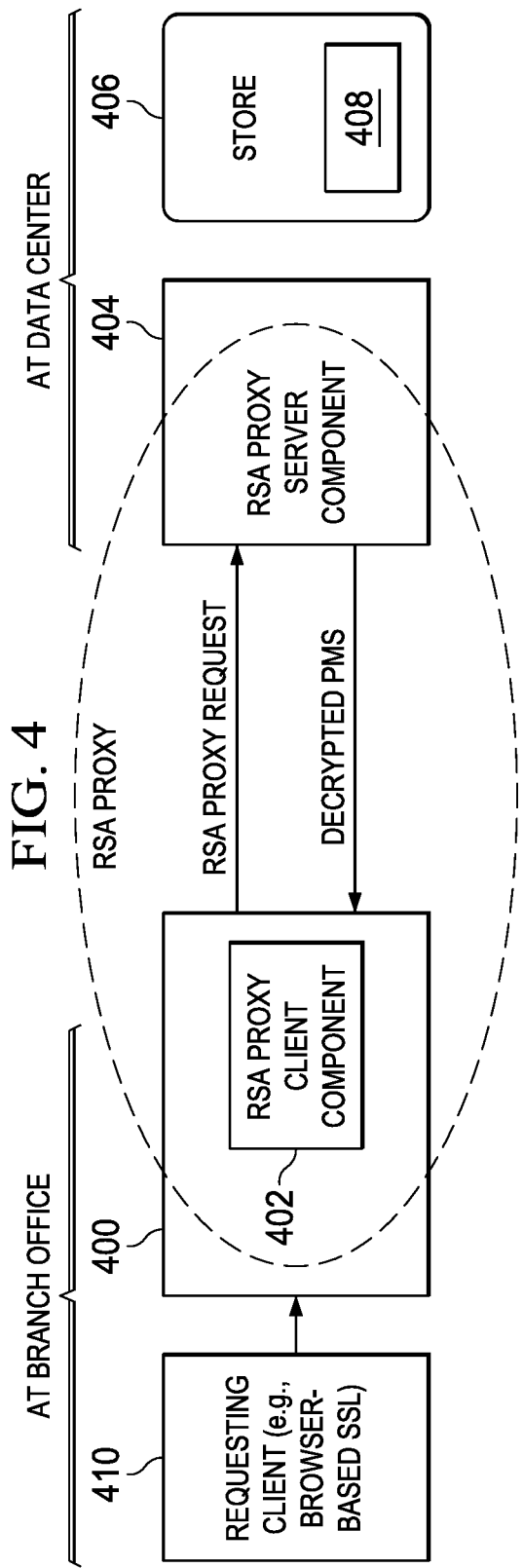
FIG. 4 illustrates the RSA proxy technique of this disclosure.

As described there, the conventional SSL handshake and, in particular, the decryption of the encrypted pre-master secret, occurs externally to (i.e., remotely from) the normal SSL termination point (the SSL server). As illustrated in FIG. 4, the SSL server 400 at the termination point includes a "client component" 402 of a proxy server whose "server component" 404 is located remotely. The server component 404 has associated therewith a data store 406 in which decryption key(s) 408 are maintained. These decryption keys 408 are not accessible to the client component 402. As will be described, during an SSL handshake, and instead of decrypting encrypted pre-master secrets itself, the client component 402 proxies (forwards) an encrypted pre-master secret that it receives (from a conventional SSL client 410) to the server component 404 and receives, in return, a decrypted pre-master secret. The remainder of the SSL transaction (between SSL server 400 and the SSL client 410) completes normally. In this approach, SSL private keys are not stored on the SSL server (or, more generally, at the SSL termination point).

Preferably, the client component 402 and the server component 404 of the proxy server are based on RSA encryption; thus, these components are sometimes referred to herein as components of an RSA proxy. The forwarding of the encrypted pre-master secret (from the client component to the server component) is sometimes referred to herein as an RSA proxy request. While RSA is a preferred algorithm, other asymmetric encryption algorithms may be used as well.

Referring now back to FIG. 3, branch office and data center machines preferably use a secure connection (e.g., mutually-authenticated SSL connections) to communicate and pass traffic. Other types of secure connection (e.g., IPSec VPN) may be used. These connections are used for RSA proxy requests, user data, and other traffic. As noted above, the RSA proxy client component executes in the branch office, while its associated server component executes in the (more secure) data center. In one embodiment, every machine has a single client certificate and keypair used for communication with peers. When a new machine is provisioned (e.g., by the CDN customer portal), the machine generates a private key and CSR (Certificate Signing Request) and sends the latter to the AMG. The CSR preferably contains a pair of identifiers, such as a unique serial number for the branch office or data center machine, as well as a serial number for the CSR version. The AMG signs the CSR (preferably using a certificate authority (CA) associated with the CDN) and sends the certificate to the branch office machine. Additionally, the AMG sends a message containing the certificate details (serial number pair) to any data center that may communicate with the branch office (based upon the peer configuration in the portal). The AMG, using other CDN key management infrastructure, signs the client and server CSRs (preferably using the CDN-associated CA). Preferably, both the branch office machine and data center machine maintain a collection of valid peers and CAs. This collection is updated by the AMG to support rotation and revocation. Moreover, preferably each box has a copy of the CA as well as a whitelist of the acceptable peers, identified by box and certificate serial number. To establish the mutual authentication, both sides of the mutual SSL connection (in other words, the RSA proxy client component on one side, and the RSA proxy server component, on the other) verify that the peer certificate chain has a root node that matches the CA and contains an allowable serial number pair. The client and server components also verify that the peer certificate contains the expected machine serial number.

As shown in FIG. 4, the RSA proxy client 402 is part of the SSL transport module. In operation, when a ClientHello is received (from an incoming SSL handshake request), the SSL module checks a learning table of IP addresses (plus port) and certs. If the entry does not exist, the data is streamed unmodified. If the data center machine can perform RSA proxying for the IP and port, it will send back a new message containing the RSA proxied server cert. The SSL module adds the IP address and cert to the learning table. On a next new (not resumed) SSL transaction for that IP address, the SSL module finds the entry and knows that it will be performing an RSA proxy transaction. Learning table entries are removed if they are used for an RSA proxy request which fails (or, in the alternative, after a period of not being used). These entries can be updated by the data center machine at any time, e.g., by the proxy client sending another message with the new cert for a particular IP and port.

During the handshake, the module terminates the SSL connection and sends a ServerCertificate to the requesting client with the cert from the learning table. When the ClientKeyExchange message and ePMS are received, the module sends the RSA proxy request to the correct data center. According to this disclosure, and as noted above, the RSA proxy request and response are handled by the server component of the RSA proxy server 404, which sends and receives the data over the mutually-authenticated SSL connection. If the server component 404 of the RSA proxy server returns a failure or times-out, the SSL module (the client component 402) terminates the client connection and the handshake does not succeed.

Without limitation, the SSL module is implemented as an SSL protocol terminator. In one embodiment, it is program code build on top of standard OpenSSL.

The RSA proxy client component (the SSL module in the branch office) uses a message interface to send the RSA proxy request and response over the mutually-authenticated SSL connection. Preferably, the RSA client request is a packet that includes the following information fields: {ePMS length, ePMS, hash of a server certificate}. The response packet returned from the RSA proxy server component (the SSL module in the data center) has the following information fields: {status, decrypted PMS length, decrypted pre-master secret}.

An embodiment of the RSA proxy server component executing at the data center facility is now described. As noted, its basic operation is to receive unencrypted packets containing the request specified above and to respond with the defined response packet. Preferably, the RSA proxy server maintains a least-recently-used (LRU) cache of ePMS values. Before performing a decryption, the module checks the cache to see if the requested ePMS has been seen. This check may be performed using a hash lookup scheme. If the hash of the encrypted pre-master secret already exists in the cache, a bad status is returned to the RSA proxy client component (and an error or alert is generated for the administrator). Preferably, the server component of the RSA proxy server rate limits requests to prevent a compromised machine from using a flush attack to remove a previously decrypted secret. Preferably, the server component of the RSA proxy server also maintains a table of the certificate and keypairs for which it can act as a proxy. Using this table (which also may be implemented as a hash table) enables the proxy server to efficiently look up server keypairs (e.g., by the hash of the certificate which is sent by the client component). Once the server component of the RSA proxy server has verified the ePMS is new, it adds it to the cache, looks up the server private key in its table, decrypts the ePMS, and sends the response.

The technique described in U.S. Publication No. 2013/0156189 has many advantages. The primary advantage is that SSL private keys are not stored on the SSL server. In a distributed solution such as described above, this means that the private keys are not stored in the branch office box that is terminating SSL, but instead at the data center box that is hosting the server component of the RSA proxy server. With replay protection implemented, an attacker cannot use a compromised SSL server to decrypt previous SSL transactions. On a normal SSL server, if the key is compromised, other technologies (such as certificate revocation lists or OCSP at the client browser) must be used to prevent use of the stolen SSL key. With RSA proxy, the service provider only needs to make a configuration change in the RSA proxy server. Using this distributed approach, the computationally-expensive part of the SSL transaction, the RSA decryption, can be done on a machine with custom hardware in the data center.

If a web proxy node (at a branch office) is discovered to be compromised, the administrator simply needs to remove authenticated credentials for the compromised node. For standard SSL, the revocation would need to be done on each end user system, which may be more difficult to administer. Additionally, key rotation only needs to occur on the RSA proxy machine, rather than all the web proxy machines, as would be required with standard SSL.

The behind-the-firewall embodiment is not intended to be limiting. The RSA proxy approach may be used whenever an enterprise uses CDN technologies (such as described above) over Internet links as an optimize WAN connecting branches, data center, teleworks and mobile users to applications over the Internet. Still more generally, the approach may be used whenever one party (the client) wishes to encrypt communications via RSA-based SSL with another party (the server) and the server is not trusted to store the RSA private key directly.

Forward Secrecy in a Terminating SSL Connection Proxy Using EDH

In the above-described paradigm, it is assumed that the RSA proxy server component (more generally, the "key owner") has good security, and that an encrypted and authenticated bi-directional communication channel with the RSA proxy client component (more generally, the "server") to communicate the requests. If, however, security of the server cannot be fully assured (or the server is compromised), an individual (or computing entity) who had been watching and recording communications between the requesting client and the server could gain access to the archived encrypted streams. This malicious third party entity would do this by simply forwarding captured ePMS's along to the key owner, which might then decrypt them as if the request were coming from the server, thereby potentially allowing the malicious third party to gain access to the stream's contents. An observer also might be inclined to represent to the key owner that the server has succumbed to a break-in; upon learning this (untruth), the key owner might then simply sever all communications and no longer decrypt ePMSs on the server's behalf. Even if audit protections are in place to protect against such schemes, time may pass before any such break-in is detected and during which valid decryptions can be requested on behalf of the bad actor.

In other words, the ePMS decryption request is itself potentially a vector for defeating forward secrecy. To counter this potential problem, this disclosure describes a method to secure the keying material decryption stage itself from replay attacks, and to provide forward secrecy for that leg of communication. As before, it is assumed that the server holds only the public certificate for the given domain name, and further that the private key is held by the key owner.

The following enhancement utilizes the Ephemeral Diffie-Hellman RSA key exchange algorithm, referred to as dhe_rsa in the TLS 1.2 RFC Track 5246, and as EDH_RSA within the OpenSSL library, once again without requiring the presence of the RSA private key locally on the server.

Figure 5:
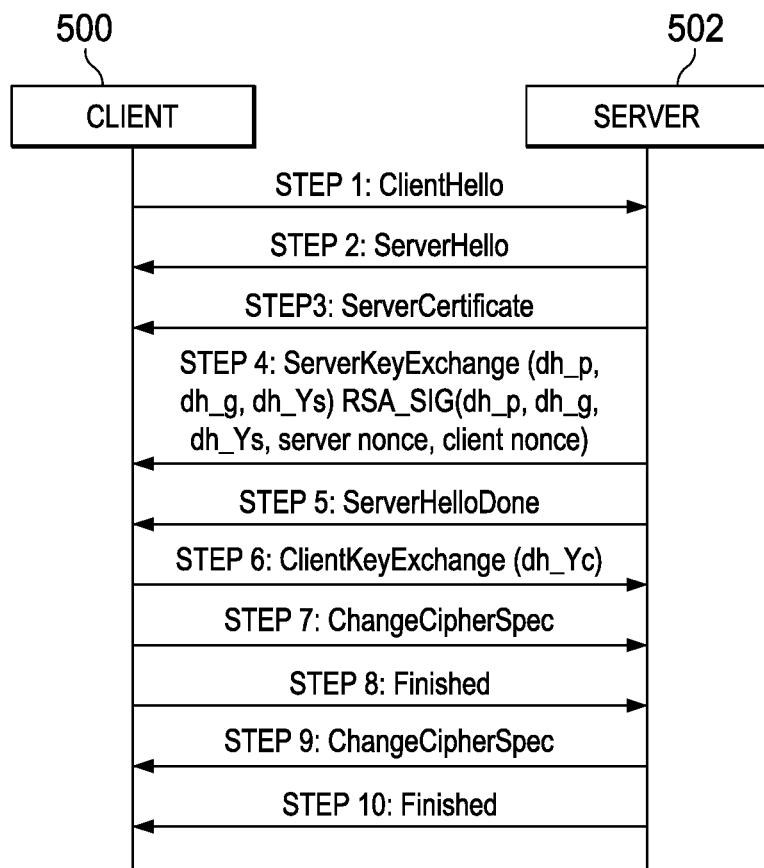
FIG. 5 illustrates a conventional Ephemeral Diffie-Hellman RSA key exchange.

By way of background, FIG. 5 illustrates a conventional EDH_RSA key exchange handshake protocol between a client 500, and a server 502. The protocol begins at step 1, with the client 500 issuing a ClientHello message listing the ciphers it is willing to use, together with other TLS data, such as a pseudo-random number (client nonce), protocol version, etc. At step 2, the server 502 responds with a ServerHello message that contains the chosen cipher for the key exchange (e.g., Diffie-Hellman (D-H), Ephemeral Diffie-Hellman (EDH), etc.), the server's pseudo-random number (server nonce), protocol version, etc. At step 3, the server 502 sends the client 500 a ServerCertificate message, which contains the RSA certificate for the digital property being visited. This certificate is signed by a Certificate Authority that the client must trust, and it contains the RSA public key for the server. The client verifies the signatures in the trust chain and extracts the public key. At step 4, the server 502 generates the Diffie-Hellman public parameters that it will be using, namely, the prime modulus (dh_p parameter), the generator (dh_g parameter), and the server's public Diffie-Hellman value (dh_Ys parameter) based upon the server's secret Diffie-Hellman value and dh_p and dh_g. The server then signs these parameters, as well as the server and client nonces, using the private RSA key that is paired to the public RSA key from the certificate described in step 3. The signature is created so that the client can trust there is no man-in-the-middle that is providing the information (the public parameters). At step 5, the server 502 transmits to the client the ServerHelloDone message indicating that it is finished with the Hello Exchange.

At step 6, following verification of the signature, the client generates its public Diffie-Hellman value (dh_Yc parameter) from its secret Diffie-Hellman value and the received dh_p and dh_g parameters, and then sends the public D-H value to the server in a ClientKeyExchange method. At step 7, the client (which can now generate the pre-master secret based on its own Diffie-Hellman secret parameter and the dh_Ys parameter of the server) sends a ChangeCipherSpec message to the server indicating that it is now changing to use the agreed-upon symmetric cipher (from step 2). At step 8, the client sends a Finished message with a hash of all prior messages to ensure that no modifications occurred during the handshake. At step 9, the server (which can now generate the pre-master secret based on its own secret parameter and the dh_Yc parameter of the client) sends a ChangeCipherSpec message to the client indicating that it, too, is now changing to use the agreed-upon symmetric cipher (from step 2). At step 10, the server sends a Finished message, once again with a hash of all prior messages to ensure that no modifications occurred during the handshake, which is now completed. Following the key exchange, once the pre-master secrets are generated, a pseudorandom function (PRF) is applied by each of the client and server to generate the symmetric keys that will secure the channel.

In Ephemeral Diffie-Hellman, the client secret (used by the client) and the server secret (used by the server 502) is expected to be deleted from local memory after use.

Figure 6:
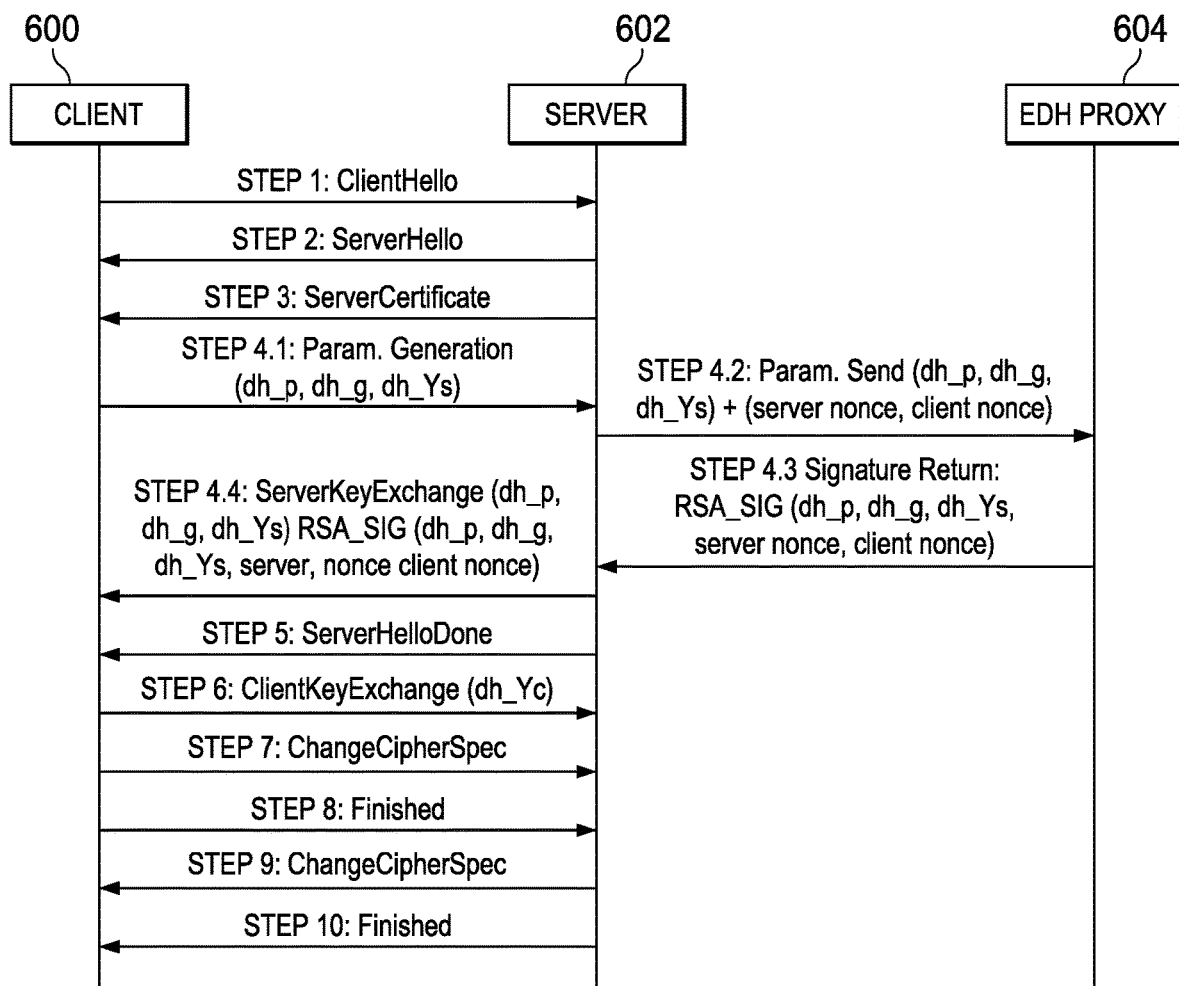
FIG. 6 illustrates a proxy-based implementation of the EDH_RSA key exchange in FIG. 5 according to this disclosure.

According to this disclosure, the above-described key exchange mechanism is modified according to the protocol illustrated in FIG. 6. Here, the client 600 and server 602 correspond to the elements in FIG. 5, but there is also another entity, referred to here as the EDH proxy 604. Typically, the server is an edge server of any overlay network, and the EDH proxy 604 corresponds to the key owner element.

Preferably, the protocol works as follows.

At step 1, the client 600 issues a ClientHello message listing the ciphers it is willing to use, together with other TLS data, such as a pseudo-random number (client nonce), protocol version, etc. At step 2, the server 602 responds with a ServerHello message that contains the chosen cipher, the server's pseudo-random number (server nonce), protocol version, etc. At step 3, the server 602 sends the client 600 a ServerCertificate message, which contains the RSA certificate for the digital property being visited. This certificate is signed by a Certificate Authority that the client must trust, and it contains the RSA public key for the server. At step 4.1, the server 602 generates the Diffie-Hellman public parameters that it will be using, namely, a prime modulus (dh_p parameter), the generator (dh_g parameter), and the server's public Diffie-Hellman value (dh_Ys parameter) based upon the server's secret Diffie-Hellman value and dh_p and dh_g. At step 4.2, and in contrast to the protocol in FIG. 5, the server 602 then sends (to the EDH Proxy 604) the given dh_p, dh_g, and dh_Ys parameters, along with the server and client nonces. At step 4.3, the EDH proxy 604, having the RSA private key, signs the parameters and nonces and returns the signature to the server. The communications between the server and the EDH proxy are preferably over a mutually-authenticated transport. At step 4.4, the server, which now has the signature, continues as before by sending the data to the client in a ServerKeyExchange message. At step 5, the server 602 transmits to the client 600 the ServerHelloDone message indicating that it is finished with the Hello Exchange.

At step 6, the client 600 generates its public Diffie-Hellman value (dh_Yc parameter) from its secret Diffie-Hellman value and the received dh_p and dh_g parameters, and then sends the public D-H value to the server in a ClientKeyExchange method. At step 7, the client (which can now generate the pre-master secret based on its own Diffie-Hellman secret parameter and the dh_Ys parameter of the server) sends a ChangeCipherSpec message to the server indicating that it is now changing to use the agreed-upon symmetric cipher (from step 2). At step 8, the client sends a Finished message with a hash of all prior messages to ensure that no modifications occurred during the handshake. At step 9, the server (which can now generate the pre-master secret based on its own secret parameter and the dh_Yc parameter of the client) sends a ChangeCipherSpec message to the client indicating that it, too, is now changing to use the agreed-upon symmetric cipher (from step 2). At step 10, the server sends a Finished message, once again with a hash of all prior messages to ensure that no modifications occurred during the handshake, which is now completed.

The EDH proxy may be located in a secure physical environment.

The above-described technique utilizing the EDH proxy provides significant advantages. Foremost, it does not require storage at the server 602 of the RSA private key. Effectively, and as described above, this creates a new security domain for servers that are trusted to terminate SSL/TLS connections but not trusted enough to store the private key themselves. In addition, and as compared to the basic RSA embodiment, the EDH-based implementation is further immune from prior information discovery attacks. In particular, with EDH_RSA, the complete pre-master secret is never exposed completely on the wire; rather, only the public portions needed to create the pre-secret are provided. Because the private portions are ephemeral and never appear on the wire (and are required to generate the pre-master secret), the protocol is safe from replay attacks. If a server machine is compromised, its ability to talk to the EDH proxy is simply revoked. Even if an attacker records TCP sessions and later comprises the server 502, the attacker cannot decode the old sessions because the ephemeral secrets (initially deleted from memory and never sent on the wire) would be required.

Additional variants include the use of EDH_DSS in lieu of EDH_RSA. Thus, the key exchange algorithm's signing function is not limited to RSA. Other certificate types like DSA may be used.

Yet another alternative is to use elliptic curve variants of Diffie-Hellman (e.g., ECDE and ECDHE) in conjunction with signed server parameters that use an asymmetric key pair. Another variant is ECDSA, which is elliptic curve-based DSA.

Generalizing, a first server generates a set of values (the server parameters) to be used in ephemeral Diffie-Hellman or elliptic curve ephemeral Diffie-Hellman. Then, the server sends them to the second server to be signed using an RSA private key, a DSA key, or other asymmetric key signing method, and then the second server returns the signature to the first server for delivery to the client in the server key exchange message. The technique herein thus may be used in a forward secrecy-preserving system for key exchange.

According to another variant, the server may generate the D-H public parameters (e.g., dh_p, dh_g, server-side secret D-H value, and dh_Ys values) in batches, e.g., during periods of low CPU use. In such case, step 4.1 above then becomes simply loading from memory or disk one of these pre-generated quadruplets. This server batch mode is in contrast to the server on-demand mode described above.

According to another variant, the EDH proxy generates the dh_p, dh_g, server-side secret D-H value, and dh_Ys values on-demand after the request phase. In this scenario, step 4.1 is omitted and step 4.2 becomes just sending only the client and server nonces to the EDH proxy. In response, and in step 4.3, the EDH proxy generates the above-mentioned quadruplet on-demand and returns the quadruplet values along with the signature. This is sometimes referred to as EDH proxy on-demand mode.

Still another variant is a mode in which the EDH proxy generates batches of dh_p, dh_g, server-side secret D-H values, and dh_Ys values during periods of low CPU use. Step 4.1 then is omitted and step 4.2 becomes sending only the client and server nonces to the EDH proxy. In response, and in step 4.3, the EDH proxy loads one of the prior-generated quadruplets and returns the quadruplet values along with the signature. This is sometimes referred to as EDH proxy batch mode.

Additionally, variants of each of these modes may be implemented where dh_p and dh_g are generated only once, with the same static pair used in all transactions (or all transactions over a given time period). Thus, those values are not required to be transmitted.

In a representative implementation, the RSA or EDH proxy is implemented in software, as computer program instructions executed by a processor.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

The EDH proxy may be configured to run on or in association with an origin server, such as a CDN customer origin. The origin-centric approach, however, is less desirable than having the EDH proxy operate within the overlay network itself. In the former case, every new connection would have to go back to the origin-operated key server, thus creating the possibility of a denial-of-service attack vector. By having the EDH proxy located within the overlay, the usual benefits of the overlay architecture can be leveraged and realized.

Preferably, the server and the EDH proxy communicate over a long-lived secure communication channel. In addition, the overlay network may operate the EDN proxy in a protected type of environment. Other techniques for protecting the proxy may be as described in U.S. Pat. No. 7,260,639, the disclosure of which is incorporated herein by reference.

There is no limitation on the type of computing entity that may implement the client-side or server-side of the connection. Any computing entity (system, machine, device, program, process, utility, or the like) may act as the client or the server.

While the techniques herein are described in the context of an RSA/EDH proxy for use in an SSL communication, this is not a limitation. Moreover, the scheme may be implemented in other transport protocols (such as TLS) that are protected by cryptographic techniques. More generally, the techniques herein may be used in any context in which secret data needs to be exchanged from one peer to another using asymmetric cryptography and wherein the receiving peer is not trusted to have the private key.

What is claimed is as follows:

1. A method, comprising:
   configuring a trusted machine into a secure physical environment, the secure physical environment being managed by a service provider;
   configuring an untrusted machine to selectively proxy key exchange material to the trusted machine;
   during a Transport Layer Security (TLS) connection handshake request received from a client at the untrusted machine, the untrusted machine configured to:
   provide to the client a public certificate for a domain, the public certificate having a public key of an asymmetric key pair, a private key of the asymmetric key pair being held in the secure physical environment of the trusted machine and therefore being inaccessible to the untrusted machine, the private key configured to digitally sign information associated with an elliptic curve-based Diffie-Hellman ephemeral key exchange;
   transmit to the trusted machine data associated with the elliptic curve-based Diffie-Hellman ephemeral key exchange, the data including at least a server public Diffie-Hellman value;
   receive from the trusted machine a digital signature, the digital signature having been generated at the trusted machine by applying the private key to the data;
   transmit to the client the digital signature, together with the data;
   receive from the client a client public Diffie-Hellman value, the client public Diffie-Hellman value having been generated by the client using a client private Diffie-Hellman value and at least some of the data; and
   generate a pre-master secret based at least in part on the client public Diffie-Hellman value.

2. The method as described in claim 1 wherein the data also includes public parameters of the elliptic curve-based Diffie-Hellman ephemeral key exchange.

3. The method as described in claim 2 wherein the public parameters include a prime modulus, and a generator.

4. The method as described in claim 2 wherein the data also includes one of: a client nonce, and a server nonce.

5. The method as described in claim 2 wherein the public parameters of the elliptic curve-based Diffie-Hellman ephemeral key exchange are generated during the handshake request.

6. The method as described in claim 2 wherein the public parameters of the elliptic curve-based Diffie-Hellman ephemeral key exchange are generated in advance of the handshake request.

7. The method as described in claim 2 wherein the public parameters of the elliptic curve-based Diffie-Hellman ephemeral key exchange are used only for the handshake request.

8. The method as described in claim 2 wherein the public parameters of the elliptic curve-based Diffie-Hellman ephemeral key exchange are used during the handshake request and at least one other handshake request.

9. The method as described in claim 2 wherein the public parameters are selected from a set of public parameters generated in batch at the untrusted machine.

10. The method as described in claim 1 wherein the elliptic curve-based Diffie-Hellman ephemeral key exchange utilizes an RSA cryptographic algorithm.

* * * * *